(12) United States Patent
Garrison et al.

(10) Patent No.: US 9,665,837 B2
(45) Date of Patent: May 30, 2017

(54) CHARGING RESOURCE USAGE IN A DISTRIBUTED COMPUTING ENVIRONMENT

(75) Inventors: John M. Garrison, Austin, TX (US); Kent F. Hayes, Jr., Chapel Hill, NC (US); Brian D. Jeffrey, Cary, NC (US); Yih-Shin Tan, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2694 days.

(21) Appl. No.: 12/185,997

(22) Filed: Aug. 5, 2008

(65) Prior Publication Data

US 2010/0036698 A1 Feb. 11, 2010

(51) Int. Cl.
*G06Q 40/00* (2012.01)
*G06Q 40/02* (2012.01)
(Continued)

(52) U.S. Cl.
CPC ............. *G06Q 10/06* (2013.01); *G06Q 20/20* (2013.01)

(58) Field of Classification Search
USPC .................... 705/16, 40, 30, 35, 400; 718/1; 455/414; 706/52; 709/226, 220, 223,
(Continued)

(56) References Cited

U.S. PATENT DOCUMENTS

2003/0050048 A1* 3/2003 Abed ............... H04L 41/12
455/414.1
2005/0071285 A1* 3/2005 Laicher .............. G06Q 10/10
705/400
(Continued)

OTHER PUBLICATIONS

Cost allocation model for shared services, Aug. 10, 2007, www.e-gineer.com, http://www.e-gineer.com/v2/blog/2OO7/O8/cost-allocation-model-for-shared.htm.*
(Continued)

*Primary Examiner* — Peter L. Ludwig
*Assistant Examiner* — Reva R Danzig
(74) *Attorney, Agent, or Firm* — Steven L. Nichols; Fabian VanCott

(57) ABSTRACT

A method of allocating costs for resource usage in a distributed computing environment includes creating a standardized template for deploying a desired functionality within the distributed computing environment; the standardized template defining computing resources of the distributed computing environment needed to support the desired functionality, associating fixed costs with the computing resources, and calculating a total allocated cost associated with the standardized template by referencing the fixed costs. A system of allocating costs for resource usage in a distributed computing environment includes a standardized template for deploying a desired functionality within the distributed computing environment, the standardized template defining a plurality of interconnected computing resources, a fixed cost associated with each of the plurality of interconnected computing resources, and a software application configured to sum the fixed costs to produce a total cost for deploying the desired functionality.

19 Claims, 5 Drawing Sheets

(51) Int. Cl.
*G06Q 10/06* (2012.01)
*G06Q 20/20* (2012.01)
G06Q 40/04 (2012.01)
G06Q 40/06 (2012.01)
G06Q 30/02 (2012.01)
G06Q 30/06 (2012.01)

(58) Field of Classification Search
USPC .................................................. 709/203, 219
See application file for complete search history.

(56) References Cited

U.S. PATENT DOCUMENTS

| | | | | |
|---|---|---|---|---|
| 2005/0108709 A1* | 5/2005 | Sciandra | ................. | G06F 9/505 718/1 |
| 2005/0177635 A1* | 8/2005 | Schmidt | .................... | G06F 9/52 709/226 |
| 2005/0197993 A1* | 9/2005 | Korotky | ............. | H04J 14/0284 706/52 |
| 2007/0198383 A1* | 8/2007 | Dow | ...................... | G06Q 40/06 705/35 |
| 2008/0294777 A1* | 11/2008 | Karve | ...................... | G06F 8/60 709/226 |

OTHER PUBLICATIONS

Cost allocation model for shared services, Aug. 10, 2007, www.e-gineer.com, http://www.e-gineer.com/v2/blog/2007/08/cost-allocation-model-for-shared.htm.*
Emmanuel, Clive, David Otley, and Kenneth Merchant, Accounting for Management Control, 2004, Thomson Learning, 2nd Edition, pp. 126-151, 160-162, and 278-287.*

\* cited by examiner

300

| AOB Solution Pricing Report | | | | Profile \| Sign Out \| Help |
|---|---|---|---|---|
| Solution: 1152 | Application Name: OnBoard Investment Banking | | | Application Version: V2.1 |

SOU & Infrastructure Costs

| Layer | Type/Status | Hardware | Software | Monthly Cost | Yearly Cost |
|---|---|---|---|---|---|
| 175 | APP/Passive | $ 500.00 | $ 800.00 | $ 0.00 | $ 0.00 |
| 170 | APP/Passive | $ 500.00 | $ 800.00 | $ 0.00 | $ 0.00 |
| 145 | APP | $ 500.00 | $ 1,250.00 | $ 3,050.00 | $ 36,600.00 |
| 140 | APP | $ 500.00 | $ 1,250.00 | $ 3,050.00 | $ 36,600.00 |
| 160 | CUSTOM | $ 350.00 | $ 0.00 | $ 350.00 | $ 4,200.00 |
| 192 | DB | $ 700.00 | $ 750.00 | $ 1,450.00 | $ 17,400.00 |
| 120 | WEB | $ 200.00 | $ 10.00 | $ 210.00 | $ 2,520.00 |

Storage Costs

| Template | Size (GB) | Price/GB | Monthly Cost | Yearly Cost |
|---|---|---|---|---|
| SAN1 | 45 | $ 2.00 | $ 90.00 | $ 1,080.00 |
| SAN2 | 800 | $ 3.00 | $ 2,400.00 | $ 28,800.00 |

Backup Costs

| Template | Size (GB) | Price/GB | Monthly Cost | Yearly Cost |
|---|---|---|---|---|
| BACKUP 1 | 100 | $ 2.25 | $ 225.00 | $ 2,700.00 |
| BACKUP 2 | 600 | $ 2.30 | $ 1,380.00 | $ 16,560.00 |

FIG. 3

| AOB Solution Pricing Report | | Profile  |  Sign Out  |  Help |
| --- | --- | --- |
| Solution: 1152 | Application Name: OnBoard Investment Banking | Application Version: V2.1 |

Total Cost of by Requirement Type

| Requirement Type | Monthly Cost | Yearly Cost |
| --- | --- | --- |
| Total Cost for Layer Infrastructure (SOUs): | $ 32,440.00 | $ 389,280.00 |
| Total Cost for Storage (SAN): | $ 24,900.00 | $ 298,800.00 |
| Total Cost for Backup: | $ 16,050.00 | $ 192,600.00 |
| Grand Total: | $ 73,390.00 | $ 880,680.00 |

FIG. 4

CHARGING RESOURCE USAGE IN A DISTRIBUTED COMPUTING ENVIRONMENT

BACKGROUND OF THE INVENTION

Aspects of the present invention relate in general to distributed computing environments and, more specifically, to a method for estimating the cost of hosting a virtualized service in a distributed computer environment.

Estimating the costs of supporting an application or other function within a distributed computing environment can be particularly challenging. In a distributed computing environment, multiple hardware and software resources are combined and interconnected to support one or more functions. A fundamental accounting requirement for an organization is to calculate present costs and estimate future costs associated with providing a function or service. However, in a distributed computing environment, it can be difficult to ascertain which physical resources are contributing to a function and the extent of that contribution. Consequently, calculating usage-based chargeback for physical resources used by various departments to support a range of functionality can be challenging.

BRIEF SUMMARY OF THE INVENTION

A method of allocating costs for resource usage in a distributed computing environment includes creating a standardized template for deploying a desired functionality within the distributed computing environment; the standardized template defining computing resources of the distributed computing environment needed to support the desired functionality, associating fixed costs with the computing resources, and calculating a total allocated cost associated with the standardized template by referencing the fixed costs.

A system of allocating costs for resource usage in a distributed computing environment includes a standardized template for deploying a desired functionality within the distributed computing environment, the standardized template defining a plurality of interconnected computing resources, a fixed cost associated with each of the plurality of interconnected computing resources, and a software application configured to sum the fixed costs to produce a total cost for deploying the desired functionality.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 3 is an illustrative screenshot which shows the calculation of costs associated with various computing resources within a distributed computing system, according to one embodiment of principles described herein.

FIG. 4 is an illustrative screenshot which shows the total costs for hosting a virtualized application on a distributed computing system, according to one embodiment of principles described herein.

Throughout the drawings, identical reference numbers designate similar, but not necessarily identical, elements.

DETAILED DESCRIPTION OF THE INVENTION

Figure 1:
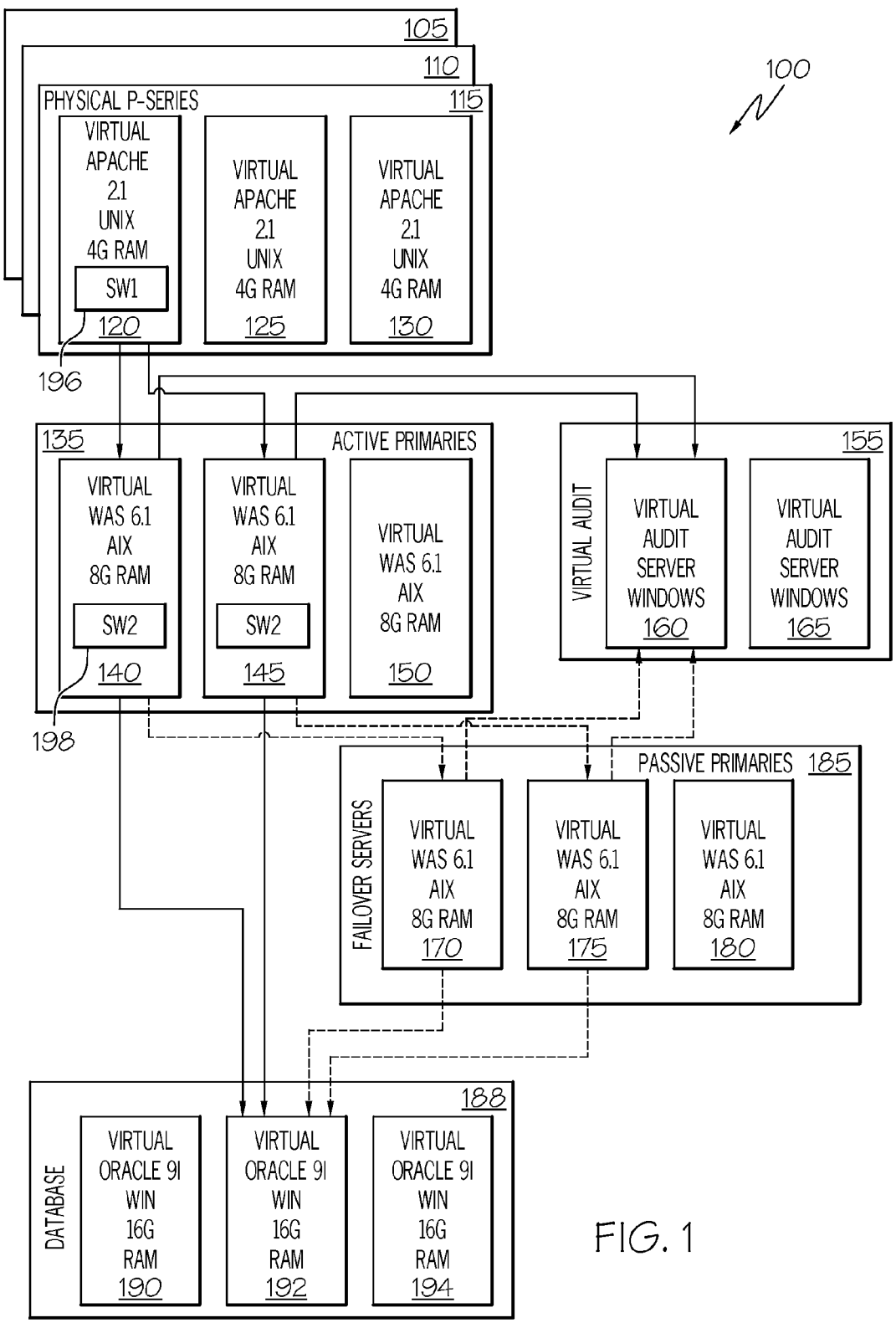
FIG. 1 is a diagram of an illustrative distributed computing system hosting a virtualized application, according to one embodiment of principles described herein.

Estimating the costs of supporting an application or other functionality within a distributed computing environment can be particularly challenging. In a distributed computing environment, multiple hardware and software resources are combined to allow users to utilize the computer environment in a transparent, open, and scalable manner. Many distributed computing environments are more fault tolerant, capable, and powerful than stand-alone computer systems. Distributed computing environments are typically formed by a number of physical computing resources (such as processors, random access memory, disk storage, etc.) which are configured to communicate over one or more networks.

The physical computing resources are allocated according to the needs of the applications or users supported by the distributed computing environment. This allocation process is one form of virtualization of computer resources. Virtualization is a framework or methodology of dividing physical computing resources into multiple execution environments. This can be accomplished by applying one or more concepts or technologies such as hardware and software partitioning, time-sharing, partial or complete machine simulation, emulation, and others.

Virtualization is often used to hide the actual physical characteristics of computer resources from the user or application. For example, a single physical resource, such as a server, may be divided into several virtual machines which appear to operate independently and perform different functions. Additionally, virtualization may make the combination of multiple physical resources appear as a single virtual resource. For example, a first physical server may provide a web interface to a user, while two physical application servers provide functionality underlying the web interface, and a fourth server supports a database which is accessed by the two application servers. The users are unaware that four physical machines are supporting their use of the web interface and its functionality. Virtualization of the distributed computing environment has seamlessly created the required combination of computing resources to support the functionality desired by the user.

A fundamental accounting task for an organization is to calculate present costs and estimate future costs associated with providing a function or service. Knowledge of present and future costs allows the organization to optimally distribute limited resources, make business decisions, and comply with regulatory requirements. When a single function is performed by a single physical computing resource, the calculation of present and future costs for providing the function can be straightforward. For example, a department within an organization owns a group of servers. It is a relatively simple matter to apply a recurring debit reflecting the cost of the servers to that department every month.

However, in a virtualized distributed computing environment, it can be difficult to ascertain which physical resources are contributing to a function and the extent of that contribution. Consequently, calculating usage-based chargeback for physical resources used by various departments to support a range of functionality can be challenging.

One method of assigning chargeback costs for functions provided by a virtualized computing system requires extensive real-time metering of physical resources as they support various functions. This method can be accurate in calculating actual costs, but can require additional software, extensive computing overhead, and a large amount of data analysis. Further, metering methods are less useful in making cost estimates for a proposed function or estimating future costs of an existing function.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Estimating or calculating costs within a distributed computing environment can be accomplished by creating a number of solution profile templates which provide standardized solutions for common deployments. These solution profile templates incorporate a number of Standard Operating Units (SOUs) that can be combined to form the desired execution environment. An SOU defines a virtual computing element which has predefined characteristics and known costs. From the catalog of available SOUs, standardized virtual components can be created and combined to form a virtual system as defined by the solution profile template. Each of these virtual components complies with an SOU definition and consequently has known costs. This method can avoid non-standard deployments within a distributed computing environment and the wide variation in cost parameters that accompany these non-standard deployments. Further, the use of solution profile templates and SOUs can minimized the time and cost of deploying and supporting a desired function.

The method for calculating the chargeback amount for physical and software resource usage is significantly simplified in a virtual system that follows a solution profile template. The fixed-price points for each SOU and any other costs (such as network disk storage or backup costs) are totaled and presented as the chargeback cost.

FIG. 1 is a diagram of one illustrative embodiment of a distributed computing environment (100) hosting a virtualized application. The distributed computing environment (100) consists of a number of physical resources (105, 110, 115, 135, 155, 185, 188) which are interconnected by a network or otherwise in communication with other physical resources. By way of example and not limitation, these physical resources could be servers, such as an IBM™ pSeries server or an Intel™ processor based xSeries server. Additionally these servers may run a variety of operating systems, such as Linux, UNIX, Windows™, or other similar operating systems. For example, a first group of physical servers (105, 110, 115) may be a pSeries servers running UNIX.

According to one exemplary embodiment, each of the physical resources is divided into various virtual machines according to an SOU definition. For example, a pSeries server (115) may contain 12 GigaBytes (GB) of Random Access Memory (RAM) and a central processing unit (CPU) operating at 3 GHz. This computational capability and memory capacity may be divided into three virtual machines (120, 125, 130). In this example, each of the virtual machines has one third of the CPU clock cycles and one third of the total RAM contained in the physical machine. This would comply with an SOU definition which calls out a virtual machine with 1 GHz processor and 4 GB of RAM. These virtual machines (120, 125, 130) act as independent computational entities. For example, virtual machines running on the same physical resource may utilize dissimilar operating systems or support different applications. According to one exemplary embodiment, the virtual machines (120, 125, 130) run an Apache 2.1 HTTP server on a UNIX based operating system. Thus one physical computing system (115) can host a number of virtual machines (120, 125, 130), each of which may be a Web Server or other device. Similarly other physical resources (135, 155, 185, 188) may be divided into virtual machines that host various operating systems and applications. By way of example and not limitation, a second physical resource (135) may host Web Application Servers (WAS) (140, 145, 150) using an Advanced Interactive eXecutive (AIX) operating system. A third physical resource (155) may host a custom application such as virtual audit servers (160, 165) on a Windows™ operating system. A fourth physical resource (188) hosts three virtual Oracle™ 9i database servers (190, 192, 194).

Various virtual machines may be operated together to support a desired function. For example, an investment bank may desire functionality provided by an investment banking application. This investment banking application may serve as an interface for analyzing market data and investment returns. Using a solution template for that particular class of web accessible business applications, the various SOUs needed could be identified and corresponding virtual machines created on various physical resources. According to one exemplary embodiment, a first Virtual Apache Web server (120) may host the investment banking software application (196). The functionality underlying this website is supported by two virtual WAS servers running on AIX (140, 145) running a second application (198). The two virtual WAS servers (140, 145) access a database (192) that is supported by a virtual Oracle™ 9i application running on a Windows™ operating system.

The WAS servers (140, 145) retrieve market and investing data from the Oracle™ database (192) and perform the requested calculations to support the functionality of the investment banking application. Because the investment banking application delivers mission critical results to the organization, they have located a passive primary physical machine (185) in a second location. The passive primary machine (185) is divided into a number of virtual WAS servers (170, 175, 180). The virtual WAS servers (170, 175, 180) can communicate with the virtual audit server (160) and the virtual database (192). In the event that there is a disruption which prevents the active primary machine (135) from communicating or performing, the passive primary machine (135) can serve as a failover, thereby maintaining the mission critical function.

There may be any number of other computing elements which are integrated into the virtualized computing infrastructure. One example may be a virtual audit machine (155) which supports a virtual audit server (160) running on a Windows™ operating system.

Figure 2:
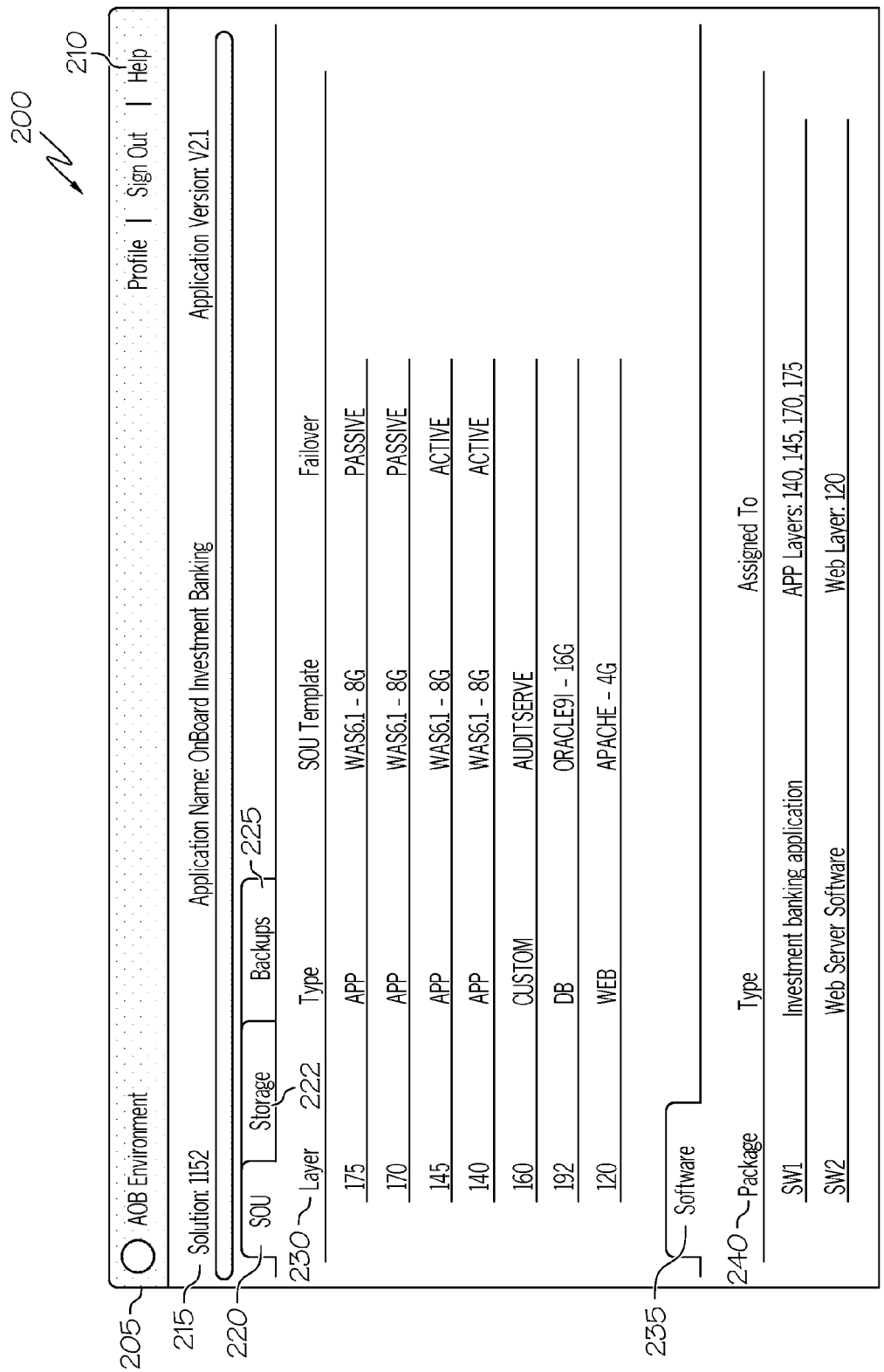
FIG. 2 is an illustrative screenshot of software which tracks the configuration and resource requirements of a virtualized application hosted on a distributed computing system, according to one embodiment of principles described herein.

FIG. 2 is an illustrative screenshot (200) of a software interface that tracks the configuration and resource requirements of a virtualized application hosted on a distributed computing system. According to one embodiment, the screenshot (200) includes a title bar (205) which identifies the section of the software that is currently being represented. The title bar (205) may also include a number of functions (210) which facilitate the use of the software by the user. A header (215) shows information about the virtualized application whose configuration and resource requirements are being displayed. In the example illustrated in FIG. 2, the virtualized application is an "OnBoard Investment Banking" application with an application version of "V2.1."

A number of tabs (220, 222, 225, 235) may allow the user to access various categories of configuration and resource information including, an "SOU" tab (220), a "Storage" tab (222), a "Backups" tab (225), and a "Software" tab (235). According to one exemplary embodiment, the "SOU" tab (220) displays information about computing elements configured according to a solution profile template and/or SOUs. As described above, an SOU is a standardized definition for a virtual or physical machine that has a predetermined configuration suitable for supporting a given component of the "OnBoard Investing Banking" application. A first sub-header (230) identifies the various columns of data displayed within the SOU tab (220).

According to one exemplary embodiment, the "OnBoard Investment Banking" application is configured to operate using seven virtual elements which comply with SOU definitions: two active primary application servers each running WAS 6.1 with 8 GB of RAM; two passive failover application servers each running WAS 6.1 with 8 GB of RAM; one custom audit server; one database running Oracle™ 9i with 16 GB of RAM; and a web server running Apache with 4 GB of RAM. As illustrated in FIG. 1, each of these elements may be a virtual machine created by dividing the resources of a physical machine into one or more virtual machines. Additionally or alternatively, a portion of the virtual machines may be formed by combining the resources of one or more physical machines into a virtual machine.

The "Software" tab (235) describes the applications which are being used to create the functionality which supports the "OnBoard Investment Banking" application. A second sub-header (240) identifies the types of data displayed in the table below. The "Package" column contains a software package identifier; the "Type" column contains a textual description of each software package or component; and the "Assigned to" column describes which layers will utilize a given software package. In the example illustrated in FIG. 2, a first software component, "SW1" (FIG. 1, 196) is the actual investment banking application. This investment banking application will be used on machines within the application layer, namely, two active primary application servers and two passive failover application servers. The second software component "SW2" (FIG. 1, 198) is a web server software application which forms the interface for interacting with the investment banking application. A number of other software components could be used within the system. For example, various operating systems and middleware may be installed on the virtual machines.

FIG. 3 is an illustrative screenshot (300) showing a calculation of costs associated with various elements which support functionality in a distributed computing environment (100, FIG. 1). According to one illustrative embodiment, the screenshot (300) includes a title bar (305) which shows that an "AOB Solution Pricing Report" is being displayed. Similar to FIG. 2, a header (307) shows information about the virtualized application whose configuration and resource requirements are being displayed. In this example, the display below the header (307) is divided into three segments: an "SOU & Infrastructure Costs" segment (310); a "Storage Costs" segment (315), and a "Backup Costs" segment (320). These segments (310, 315, 320) inventory the costs associated with elements listed in the corresponding tabs (220, 222, 225, 235; FIG. 2).

The "SOU & Infrastructure Costs" segment (310) has a sub-header (325) which identifies the columns of the segment (310). In this example, a first column "Layer" is a number identifier of the SOU element. For clarity, the numeric identifiers of the various SOU elements were chosen to correspond to identifying numbers used in FIG. 1 and FIG. 2. A second column, labeled "Type/Status" describes the type of resource and whether a given resource is active or passive. A third column, labeled "Hardware," lists the monthly cost associated with providing and maintaining the hardware which supports a virtual machine. For example, the cost to provide a physical pSeries server (see e.g. 115, FIG. 1) may be $1,500 each month. If the physical pSeries server supports three virtual machines (see e.g. 120, 125, 130; FIG. 1), the cost to support each virtual machine would be one third of the total cost, or $500 per month. A fourth column, labeled "Software," gives the total monthly cost for providing and/or supporting software running on a given virtual machine. This software may include operating system software, middleware, and various applications.

The fifth column, labeled "Monthly Cost," lists the monthly costs to support the various elements. According to one illustrative embodiment, the cost of the passive failover elements is added to the cost of the active elements. For example, the active primary WAS 6.1 application server (145, FIG. 1) has a passive backup server (170, FIG. 1). The cost of supporting the passive backup server (170, FIG. 1) can be added to the monthly cost of the active primary application server (145, FIG. 1). In the example shown in FIG. 3, the hardware cost ($500) and the software cost ($800) for the passive backup server (170, FIG. 1) is added to the hardware cost ($500) and the software cost ($1250) of the active server (145; FIG. 1) for a total monthly cost of $3,050. Because the monthly cost of the passive backup server (170, FIG. 1) is added to the monthly cost of the primary server, the total monthly cost of the passive backup server (170, FIG. 1) is displayed as zero. A sixth column, labeled "Yearly Cost," is calculated by multiplying the monthly cost by twelve to obtain the total yearly costs for the various resources.

The "Storage Costs" segment (315) includes a second sub-header (330) which identifies the columns displayed within this segment. In this example, the "Storage Costs" segment (315) describes the costs associated with hard disk storage available on an ongoing basis for the "OnBoard Investment Banking" application. The "Template" column identifies the SOU template from which the costs are derived. For example, a first line lists a SOU template as "SAN1," which describes storage located on a Storage Area Network (SAN). The size of the storage capacity allocated to the "OnBoard Investment Banking" application under the SAN1 template is 45 GigaBytes (GB). The cost per GB per month is $2.00. The storage capacity allocated under the SAN2 template is 800 GB which has a cost of $3.00 per GB per month. The difference in the price per GB for the various SAN templates may reflect different capabilities of the SAN storage. For example, the SAN1 template may describe slower or less reliable disk storage than the higher priced SAN2 storage. One of the advantages of using the solution template/SOU model to create chargeback costs is that a number of predefined SOUs can be created for commonly used components within a distributed environment. The SOU then allows the customer to negotiate pricing or alter the configuration based on cost. The cost of hosting the virtualized application in the distributed environment is then known and can be used to estimate ongoing or future costs of a particular organization or division. The "Monthly Cost" of the storage is calculated by multiplying the Price per GB by the storage size. The total "Yearly Cost" is calculated by multiplying the monthly cost by the 12 months in a year. For example, the SAN1 monthly cost is 45 GB*$2.00 per GB per month=$90 per month. The yearly cost is $90 per month*12 months per year=$1080.

The "Backup Costs" segment (320) describes the costs associated with periodic backups of the "OnBoard Investment Banking" application and the data that it generates. A third sub-header (335) describes the various columns that categorize the data within the segment. The "Template" column identifies the SOU template associated with the backup function and used to generate cost or pricing information. For example, the "Backup 1" SOU template may be used for weekly backups, while the "Backup 2" SOU template is used for monthly back ups. In this example, a weekly backup has 100 GB of storage space reserved and a monthly backup has 600 GB of storage space reserved. Similar to the "Storage Costs" segment, cost per GB of storage per month is listed in a "Price/GB" column, the total monthly cost is listed in a "Monthly Cost" column and the total yearly cost is listed in a "Yearly Cost" column.

FIG. 4 is an illustrative screenshot (400) which shows total costs for hosting a virtualized application in a distributed computing environment (100, FIG. 1). In the example illustrated in FIG. 4, the total costs are listed by requirement type (405). A variety of other arrangements could be used for displaying the total costs as best suits the situation and the desires of the user. The sub-header (410) describes the columns of data below. A first column describes the requirement type, a second column may describe monthly costs associated with the listed requirements, and a third column describes yearly costs associated with the listed requirements.

Those of skill in the art will appreciate that there are a variety of formats and options for displaying accounting information. The examples illustrated in FIGS. 2-4 are only illustrative embodiments of information displays and software interfaces for manipulating and presenting accounting information. A variety of options that may be available to the user for customizing the data collection and for data manipulation and display have been omitted from the figures.

Figure 5:
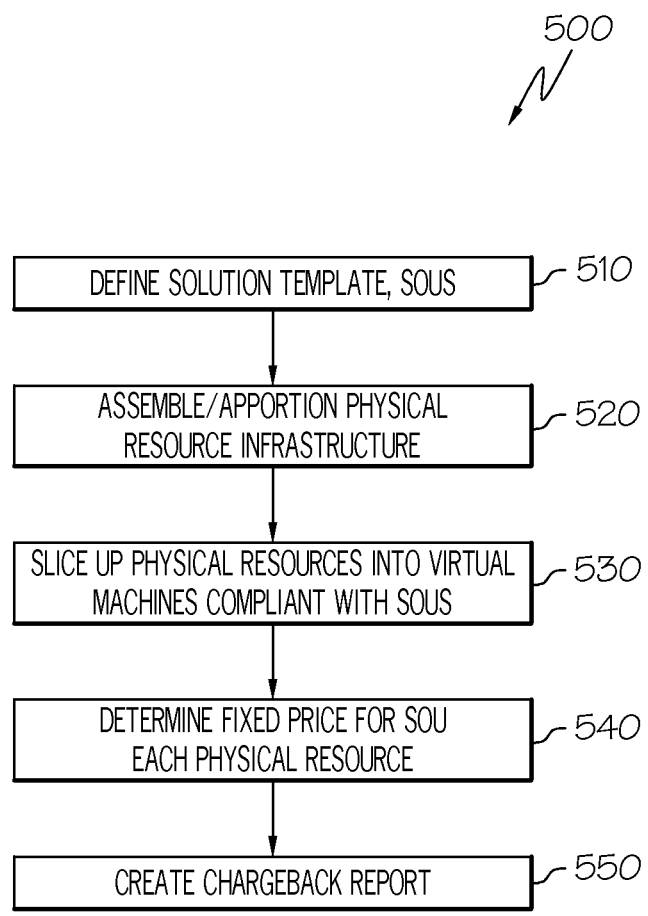
FIG. 5 is a flowchart showing an illustrative method of allocating costs for resource usage in a distributed computing environment, according to one embodiment of principles described herein.

FIG. 5 is a flowchart (500) showing an illustrative method for distributing charges to various departments or division for resource usage in a distributed computing environment. According to the illustrated embodiment, a solution templates and a number of SOUs are first defined (step 510). A solution template describes the overall architecture of the virtualized computing environment. For example a solution template may be created for hosting a standardized web application. The solution template may include all of the elements and interconnectivity required to host the standardized web application. These solution templates could be valuable in estimating pricing and saving time in assembling the virtualized resources required to accomplish the desired functionality.

An SOU would typically define various characteristics and costs of a unit. For example, an SOU may define one or more of: computation capacity, memory, storage, backup capacity, operating system, software applications, or other relevant characteristics. In principle, SOUs may be created for each element, virtual or physical, within the distributed computing environment. For example, SOUs may be created for virtual machines, storage space, network traffic, applications, backup capacity, or other elements or functions within the distributed computing environment. In some circumstances, it may be most convenient to use SOUs to define virtual server characteristics and separately itemize costs associated with storage, backup, network usage and other similar system functions.

The cost and configuration of the SOUs can be defined as to best meet the needs of the customer. For example, the cost of an SOU provides a fixed price for a given resource. The customer can then negotiate the cost or alter the configuration based on the price of the resource so as to best allocated the customer's available budget or achieve desired functionality.

The physical resource infrastructure necessary to meet the requirements outlined in the solution template/SOU is then assembled and/or apportioned (step 520). For example, if an existing physical infrastructure is used, the required amount of CPU processing capability, RAM, connectivity, and storage capacity could be apportioned to the given application or function. If a number of older machines are available which individually lack the capacity to perform a desired function or task, these resources could be combined to form a virtual machine with the required functionality. If it is desirable for the information technology (IT) infrastructure to be enlarged to accommodate the additional functionality, physical machines and other elements could be purchased and integrated into the infrastructure. These physical resources are then divided into virtual machines or elements that correspond to the SOUs (step 530). The costs for various elements within the virtualized system would then be determined (step 540). These costs can then be itemized, totaled, or otherwise displayed within a chargeback report (step 550).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product for charging for computing resource usage in a distributed environment, the computer program product comprising:

a standardized template for deploying a desired functionality within said distributed computing environment, said standardized template specifying a plurality Standard Operating Units (SOU), each SOU defining a specific virtual computing element with predefined characteristics and known costs, such that the SOUs of the template collectively specify all of the computing resources of said distributed environment that are needed to deploy said desired functionality;

a computer usable storage medium having computer usable program code embodied therewith, the computer usable program code comprising:

computer usable program code configured to allocate existing physical resources and map assembly of any needed additional physical resources to virtual resources, said virtual resources being compliant with the SOUs of the standardized template;

computer usable program code configured to associate fixed costs with said SOUs and calculate a total cost for deploying said desired functionality by summing said fixed costs and other costs according to said standardized template; and computer usable program code configured to generate a chargeback report based on all said costs to enable a user to further negotiate cost or alter configuration of the template associated with the desired functionality to satisfy an available budget.

2. The computer program product of claim 1, wherein the computer usable program code configured to allocate existing physical resources apportions a required amount of processing capability, Random Access Memory, connectivity, and storage capacity to desired functionality.

3. A computer-implemented method of allocating costs for resource usage in a distributed computing environment comprising, with computing hardware:
   creating a standardized template for deploying a desired functionality within said distributed computing environment; said standardized template defining computing resources of said distributed computing environment needed to support said desired functionality, wherein the template comprises a plurality of Standard Operating Units (SOUs), each SOU defining a specific virtual computing element with predefined characteristics and known costs, such that the SOUs of the template collectively specify all of the computing resources of said distributed environment that are needed to deploy said desired functionality;
   associating fixed costs with said computing resources;
   allocating existing physical resources and mapping assembly of any needed additional physical resources to virtual resources, said virtual resources being compliant with the SOUs of the standardized template;
   calculating a total allocated cost associated with said standardized template by referencing said fixed costs; and
   further comprising using said total allocated cost to estimate future expenses including generating a chargeback report based on said costs to enable a user to further negotiate cost or alter configuration of the template associated with the desired functionality to satisfy an available budget.

4. The method of claim 3, wherein said standardized template defines interconnectivity between said computing resources.

5. The method of claim 3, further comprising defining standardized operating units, said standardized operating units comprising at least one attribute of a physical computing resource, wherein said computing resources of said standardized template are expressed as standardized operating units.

6. The method of claim 5, wherein defining a said standardized operating unit comprises dividing a physical computing resources into at least one virtual computing resource which corresponds to a said standardized operating unit.

7. The method of claim 5, further comprising interconnecting said virtual computing resources according to said standardized template.

8. The method of claim 3, further comprising determining a fixed cost for a computing resource defined by a said standard operating unit by:
   adding hardware costs and software costs for a physical computing resource to find a total cost for said physical computing resource; and
   dividing said total cost by the number of virtual machines hosted by said physical computing resource.

9. The method of claim 3, further comprising implementing said desired functionality according to said standardized template.

10. The method of claim 3, further comprising calculating said total allocated cost per a specified time period.

11. The method of claim 3, further comprising charging said total allocated cost to a division of an enterprise that uses said desired functionality.

12. The method of claim 3, further comprising presenting said total allocated cost to a decision maker who is considering deploying said desired functionality.

13. The method of claim 3, further comprising creating a plurality of standardized templates, each template specifying standardized computing resources needed to deploy a different desired functionality.

14. The method of claim 3, wherein at least one of the SOUs specifies a virtual machine.

15. The method of claim 3, wherein the template further comprises a listing of software components needed for the desired functionality.

16. The method of claim 3, wherein calculating a total allocated cost comprises calculating all of: SOU and infrastructure costs; storage costs and backup costs.

17. The method of claim 16, wherein calculating SOU and infrastructure costs further comprises calculating hardware costs and software costs.

18. The method of claim 16, wherein calculating storage costs is performed using SOUs of the template that pertain to storage.

19. The method of claim 16, wherein calculating backup costs is performed using SOUs of the template that pertain to backup.

* * * * *